J. M. GRIMM.
BRAKE.
APPLICATION FILED MAR. 12, 1918.
1,427,801.
Patented Sept. 5, 1922.
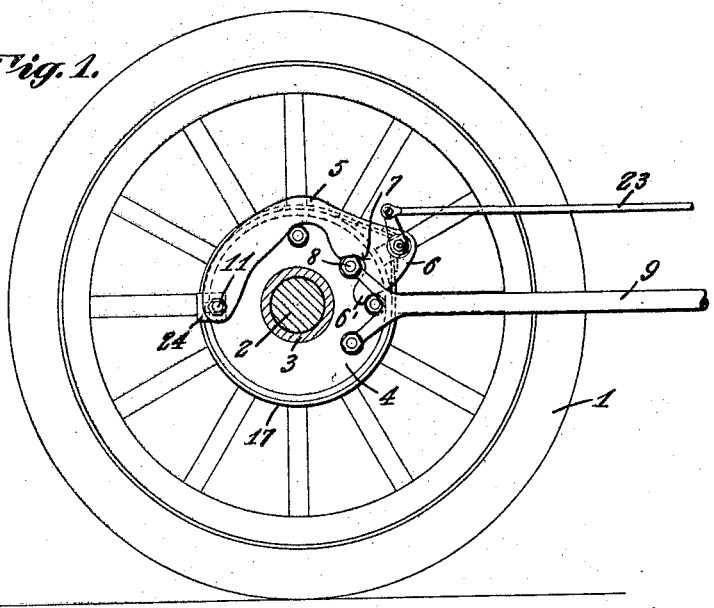
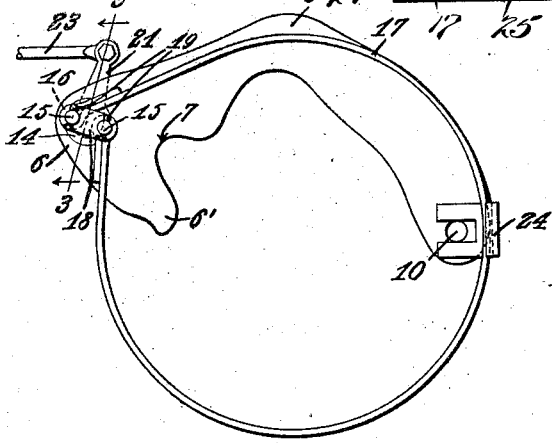
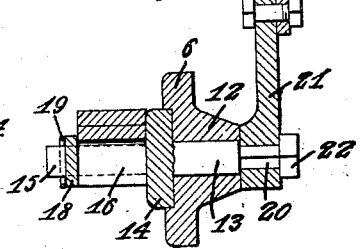
J. M. Grimm, Inventor
By C. A. Snow & Co.
Attorneys
Witness Patented Sept. 5, 1922.

1,427,801

UNITED STATES PATENT OFFICE.

JONATHAN M. GRIMM, OF APPOLO, PENNSYLVANIA.

BRAKE.

Application filed March 12, 1918. Serial No. 222,014.

*To all whom it may concern:*

Be it known that I, JONATHAN M. GRIMM, a citizen of the United States, residing at Appolo, in the county of Armstrong and State of Pennsylvania, have invented a new and useful Brake, of which the following is a specification.

The subject of this invention is a brake of the band brake type intended principally for use on automobiles.

The main object within the contemplation of the invention is the provision of an external emergency brake which may be readily applied to and removed from an automobile.

Another object contemplated by the invention is the provision of a brake the band of which will have a maximum surface contact.

A still further object within the contemplation of the invention is the provision of means for drawing the band about the drum.

Another object of the invention is the provision of a novel supporting plate which may be readily applied to an automobile.

A still further object is the provision of a simple, durable, and efficient brake.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in elevation, parts in section, of an automobile wheel with the brake applied thereto;

Figure 2 is a view in elevation of the brake viewed from the opposite side;

Figure 3 is a section on the line 3—3 of Figure 2.

Figure 4 is a horizontal section through the structure shown in Figures 2 and 3, looking upwardly.

Referring to the drawing by numerals of reference:—

One of the rear or driving wheels of an automobile is represented at 1 and this wheel is rigid on its axle 2 which axle rotates in the usual axle housing 3, the housing being provided with an annular flange 4.

The brake attachment consists of a formed plate 5 which is curved to lie against the inner face of the flange 4 and which merges, at its forward end, into a head 6. The plate, at the head end, is provided with a notch 7 which is adapted to receive the reinforcing boss formed on the flange 4 about a bolt hole through which passes the bolt 8 which secures the upper prong of the rear end of the radius rod 9. The head 6 is formed with a nose 6' which projects between the bolt 8 and the reinforcing boss of the cam shaft bolt hole and which is held firmly in such position by the said upper prong of the rear end of the radius rod 9. The rear end of the plate 5 is apertured at 10 to receive the annular boss or flange formed on the flange 4 about the brake shoe bolt hole, and a bolt 11 passing through said hole serves to clamp the rear end of the plate in place.

In that portion of the head 6 which extends beyond the periphery of the flange 4 is formed a laterally extending boss 12 which projects from one face of the head and is cored to receive a spindle 13 which extends from the center of one face of a circular head 14 from the other face of which head spaced parallel pins 15 project, the pins being positioned on opposite sides of the center of the circular head. Each pin 15 passes through a looped end 16 of a brake band 17 which is adapted to pass about a brake drum 25 as shown in figures of the drawings, in the usual and well known manner. The looped ends 16 of the band 17 are retained in place on the pins 15 by means of a plate 18 which is apertured to take over the ends of the pins and which may be held in place thereon by keys 19, or otherwise.

The portion 20 of the spindle 13 which extends beyond the boss 12 is squared and adapted to enter an aperture formed in a crank arm 21 and this extending portion 20 terminates in a cylindrical portion which is threaded to receive a nut 22 by which the crank arm 21 is bound in place. The aperture formed in the crank arm 21 is of a shape to permit the crank arm to be adjusted to positions of forty-five degrees about the squared stem 20. The usual brake rod 23 is secured to the end of the crank arm 21 for the purpose of revolving the pins 15 and drawing the brake band about the drum.

An angled plate 24 may be secured to the rear end of the plate 5 and this plate 24 overlies and straddles the brake band for the purpose of guiding the band and retaining it in place.

It will be noted that the plate 5 is not fastened to the flange 4 by bolts or other fastening devices extending therethrough and through the flange. Instead this plate is so shaped that it can be slipped onto the surface of the flange 4 so as to become interlocked with the bolts, bosses and other projections on the flange and also to extend between the flange and the forked end of the radius rod 9. By slipping the plate downwardly and rearwardly when the parts are positioned as in Figure 1 it will become thoroughly interlocked with the flange and other parts, the yoke or bracket 24 serving as an additional means for holding the plate 5 and the brake band in proper relation to each other.

It is thought that the operation of the device will be fully understood from the foregoing description without a special and detailed explanation thereof.

Having thus described the invention, what is claimed as new and sought by Letters Patent, is:—

The combination with the rear axle housing and its annular flange, of an automobile, and a radius rod connected to the flange, there being attaching devices extending from the flange, of a plate slidable onto one face of the flange into interlocked relation therewith, said plate being held against rotation upon the flange by the attaching device projecting from the flange and straddled by the plate, said radius rod and flange cooperating to hold the plate against lateral displacement relative to the flange, of a spindle mounted for rotation in the plate, spaced parallel pins projecting from one end of the spindle and out of line with the axis of rotation thereof, a brake band connected at its ends to the respective pins, and means for rotating the spindle to contract the band or to loosen the same.

In testimony that I claim the foregoing as my own, I have hereto affixed my signature in the presence of two witnesses.

JONATHAN M. GRIMM.

Witnesses:
T. H. CHRISTY,
F. B. RUMBAUGH.